US010995017B2

(12) United States Patent
Smith

(10) Patent No.: US 10,995,017 B2
(45) Date of Patent: May 4, 2021

(54) MOBILE RESERVOIR SYSTEM

(71) Applicant: Phillip Fuqua Smith, West Hollywood, CA (US)

(72) Inventor: Phillip Fuqua Smith, West Hollywood, CA (US)

( * ) Notice: Subject to any disclaimer, the term of this patent is extended or adjusted under 35 U.S.C. 154(b) by 0 days.

(21) Appl. No.: 16/940,359

(22) Filed: Jul. 27, 2020

(65) Prior Publication Data
US 2020/0354238 A1    Nov. 12, 2020

Related U.S. Application Data

(62) Division of application No. 15/794,975, filed on Oct. 26, 2017, now Pat. No. 10,730,765.

(60) Provisional application No. 62/413,321, filed on Oct. 26, 2016.

(51) Int. Cl.
| | | |
|---|---|---|
| *C02F 1/44* | (2006.01) | |
| *C02F 1/32* | (2006.01) | |
| *B01D 61/18* | (2006.01) | |
| *B01D 61/14* | (2006.01) | |
| *C02F 103/00* | (2006.01) | |

(52) U.S. Cl.
CPC ............... *C02F 1/444* (2013.01); *C02F 1/32* (2013.01); *C02F 1/325* (2013.01); *B01D 61/147* (2013.01); *B01D 61/18* (2013.01); *B01D 2311/2619* (2013.01); *B01D 2313/50* (2013.01); *C02F 2103/001* (2013.01); *C02F 2201/008* (2013.01); *C02F 2303/04* (2013.01)

(58) Field of Classification Search
None
See application file for complete search history.

(56) References Cited

U.S. PATENT DOCUMENTS

| | | | | | |
|---|---|---|---|---|---|
| 316,184 | A | * | 4/1885 | Sancan | ................... F16K 31/26 137/122 |
| 1,059,935 | A | * | 4/1913 | Guderian | ................ C02F 1/001 210/314 |
| 3,171,808 | A | * | 3/1965 | Todd | ...................... B01D 61/08 210/321.6 |
| 3,456,802 | A | * | 7/1969 | Marc | ...................... B01D 61/10 210/170.11 |
| 3,730,120 | A | * | 5/1973 | Dobell | .................... B63B 35/00 114/256 |
| 4,656,959 | A | * | 4/1987 | Moisdon | ............. B63B 35/4406 114/264 |

(Continued)

*Primary Examiner* — Robert J Popovics
(74) *Attorney, Agent, or Firm* — Rutan & Tucker LLP; Hani Z. Sayed

(57) ABSTRACT

An apparatus and a method are provided for a mobile reservoir system to provide potable water to desired destinations. The mobile reservoir system includes a waterborne vessel that includes a cargo hold. A collection unit comprised of a material for safe and sterile storage of potable water is disposed in the cargo hold. One or more collectors channel rainwater into the collection unit. Each collector is a sheet of a non-porous material supported on a retractable frame and a plurality of support arms. The sheet provides a surface area for collecting rainwater. A porous material covers the collection unit and operates as a filter for collected rainwater. A retractable cover may be extended over the cargo hold to provide protection to the collected rainwater in the collection unit. A filtration system is configured to offload the rainwater as potable water.

5 Claims, 8 Drawing Sheets

(56) References Cited

U.S. PATENT DOCUMENTS

| | | | | |
|---|---|---|---|---|
| 4,899,400 A * | 2/1990 | Torres | B65D 88/38 | 220/216 |
| 5,166,622 A * | 11/1992 | Laing | G01V 3/15 | 324/323 |
| 5,229,005 A * | 7/1993 | Fok | B01D 61/10 | 210/652 |
| 5,301,474 A * | 4/1994 | Carey, II | E03B 3/02 | 52/90.1 |
| 5,366,635 A * | 11/1994 | Watkins | B01D 61/10 | 210/651 |
| 5,730,179 A * | 3/1998 | Taylor | E04D 13/08 | 137/357 |
| 5,862,633 A * | 1/1999 | Van Ells | E03B 3/02 | 52/16 |
| 5,863,151 A * | 1/1999 | Chapotelle | E03B 3/02 | 405/52 |
| 5,873,383 A * | 2/1999 | Takai | E03B 3/03 | 137/357 |
| 6,182,680 B1 * | 2/2001 | Hart | E03B 3/03 | 137/122 |
| 6,212,837 B1 * | 4/2001 | Davis | E04B 1/003 | 52/302.1 |
| 6,226,956 B1 * | 5/2001 | Davis | E04B 1/003 | 52/11 |
| 6,436,283 B1 * | 8/2002 | Duke | E03B 3/02 | 210/172.1 |
| 6,553,723 B1 * | 4/2003 | Alcorn | E03B 3/02 | 52/15 |
| 6,576,123 B2 * | 6/2003 | Priggemeyer | C02F 1/281 | 210/155 |
| 6,592,299 B1 * | 7/2003 | Becker | E03B 3/06 | 405/210 |
| 6,619,312 B2 * | 9/2003 | Doiron | E03B 3/02 | 137/122 |
| 6,663,769 B2 * | 12/2003 | Hosoya | C02F 1/722 | 210/104 |
| 6,673,249 B2 * | 1/2004 | Max | C02F 1/265 | 210/747.5 |
| 6,818,127 B1 * | 11/2004 | Ketrow | C02F 1/004 | 210/170.03 |
| 6,821,445 B2 * | 11/2004 | Miyata | B01D 24/005 | 210/793 |
| 6,905,607 B2 * | 6/2005 | Hosoya | C02F 1/722 | 210/744 |
| 6,941,702 B1 * | 9/2005 | Abrams | E03B 1/041 | 52/16 |
| 7,025,076 B2 * | 4/2006 | Zimmerman, Jr. | E03B 1/04 | 137/1 |
| 7,081,205 B2 * | 7/2006 | Gordon | B01D 61/025 | 210/652 |
| 7,207,748 B1 * | 4/2007 | Urban | A01G 25/00 | 405/51 |
| 7,416,666 B2 * | 8/2008 | Gordon | C02F 1/441 | 210/257.2 |
| 7,476,323 B2 * | 1/2009 | Gordon | B01F 5/0688 | 210/652 |
| 7,510,658 B2 * | 3/2009 | Gordon | B01D 61/025 | 210/652 |
| 7,534,070 B1 * | 5/2009 | Urban | E03B 1/04 | 405/51 |
| 7,547,392 B2 * | 6/2009 | Gordon | E03F 1/00 | 210/242.1 |
| 7,658,843 B2 * | 2/2010 | Krock | C02F 1/441 | 210/170.11 |
| 7,726,906 B2 * | 6/2010 | Essig, Jr. | F24S 23/81 | 405/52 |
| 7,901,580 B2 * | 3/2011 | Salyer | B01D 61/08 | 210/652 |
| 8,075,765 B2 * | 12/2011 | Perlatti | B29C 66/53246 | 210/162 |
| 8,097,151 B2 * | 1/2012 | Allan | E03B 3/03 | 210/162 |
| 8,282,830 B2 * | 10/2012 | Salyer | B63J 1/00 | 210/652 |
| 8,298,415 B2 * | 10/2012 | Imahashi | C02F 9/00 | 210/202 |
| 8,404,110 B2 * | 3/2013 | Block | E04D 13/08 | 210/94 |
| 8,496,810 B2 * | 7/2013 | Forrest | E03B 3/03 | 210/162 |
| 8,640,387 B2 * | 2/2014 | Harrison | E03B 3/03 | 52/6 |
| 8,663,465 B2 * | 3/2014 | Harrison | E03B 3/03 | 210/153 |
| 9,199,864 B2 * | 12/2015 | Shinagawa | C02F 1/001 | |
| 9,279,237 B2 * | 3/2016 | Catt Lyon | E03B 3/03 | |
| 9,469,383 B1 * | 10/2016 | Cooper | B63B 25/10 | |
| 9,714,521 B1 * | 7/2017 | Aloumanis | E04H 15/54 | |
| 9,771,706 B2 * | 9/2017 | Forrest | E03B 3/03 | |
| 9,776,136 B2 * | 10/2017 | Meano, Sr. | B01D 61/10 | |
| 9,908,593 B2 * | 3/2018 | Cooper | B63B 1/047 | |
| 10,190,292 B1 * | 1/2019 | Shackelford | E03B 3/03 | |
| 10,208,462 B2 * | 2/2019 | Carter | E04D 13/00 | |
| 10,435,118 B2 * | 10/2019 | Szydlowski | B63B 25/12 | |
| 10,441,919 B2 * | 10/2019 | Oney | B01D 61/10 | |
| 10,513,446 B2 * | 12/2019 | Vuong | C02F 1/441 | |
| 10,569,842 B2 * | 2/2020 | Cooper | B63B 25/10 | |
| 10,633,834 B2 * | 4/2020 | Newsome | E03B 3/02 | |
| 10,730,765 B2 * | 8/2020 | Smith | C02F 1/444 | |
| 2001/0030161 A1 * | 10/2001 | Hosoya | C02F 1/725 | 210/744 |
| 2005/0257433 A1 * | 11/2005 | Dussault | E03B 3/03 | 52/12 |
| 2006/0101723 A1 * | 5/2006 | Baeta | E03B 3/03 | 52/16 |
| 2007/0227962 A1 * | 10/2007 | Gordon | B01D 61/025 | 210/259 |
| 2007/0289667 A1 * | 12/2007 | Hennessy | E03B 3/28 | 141/312 |
| 2008/0034492 A1 * | 2/2008 | Essig, Jr. | F24S 23/81 | 4/507 |
| 2008/0272064 A1 * | 11/2008 | Leonard | C02F 1/78 | 210/760 |
| 2009/0065504 A1 * | 3/2009 | Vos | A01G 27/06 | 220/212 |
| 2009/0166275 A1 * | 7/2009 | Burke | E03B 3/03 | 210/137 |
| 2009/0212051 A1 * | 8/2009 | Liu | E03B 3/03 | 220/23.83 |
| 2010/0038300 A1 * | 2/2010 | Allan | E03F 1/002 | 210/248 |
| 2010/0096390 A1 * | 4/2010 | Allan | E03B 3/03 | 220/565 |
| 2010/0193046 A1 * | 8/2010 | Moroder | F16L 55/24 | 137/357 |
| 2010/0199574 A1 * | 8/2010 | Perlatti | E03B 3/02 | 52/12 |
| 2010/0200482 A1 * | 8/2010 | Perlatti | B29C 66/53246 | 210/170.03 |
| 2010/0263295 A1 * | 10/2010 | Flanagan | E04D 13/08 | 52/1 |
| 2010/0270219 A1 * | 10/2010 | Block | E04D 13/08 | 210/162 |
| 2010/0288375 A1 * | 11/2010 | Thomas | E03B 3/03 | 137/358 |
| 2010/0300544 A1 * | 12/2010 | Baldwin | E03B 3/03 | 137/1 |
| 2011/0017301 A1 * | 1/2011 | Canavan | E04D 13/08 | 137/1 |
| 2011/0120561 A1 * | 5/2011 | Quigley | E03F 1/00 | 137/1 |
| 2011/0132823 A1 * | 6/2011 | Brown | E03B 3/02 | 210/170.03 |
| 2011/0147293 A1 * | 6/2011 | Imahashi | C02F 9/00 | 210/202 |
| 2011/0303307 A1 * | 12/2011 | Block | E04D 13/08 | 137/357 |

(56) References Cited

U.S. PATENT DOCUMENTS

| | | | | |
|---|---|---|---|---|
| 2012/0006412 A1* | 1/2012 | Harrison | ............... | E03B 3/03 |
| | | | | 137/1 |
| 2012/0006738 A1* | 1/2012 | Harrison | ............... | E03B 3/03 |
| | | | | 210/257.1 |
| 2012/0017996 A1* | 1/2012 | Wenger | ............... | E03B 3/03 |
| | | | | 137/1 |
| 2012/0261319 A1* | 10/2012 | Shinagawa | ............... | C02F 1/325 |
| | | | | 210/170.03 |
| 2012/0279583 A1* | 11/2012 | Forrest | ............... | E03B 3/03 |
| | | | | 137/357 |
| 2013/0087509 A1* | 4/2013 | Davis | ............... | E03F 5/14 |
| | | | | 210/747.3 |
| 2013/0193047 A1* | 8/2013 | Catt Lyon | ............... | B01D 29/05 |
| | | | | 210/170.03 |
| 2014/0129031 A1* | 5/2014 | Carter | ............... | E04D 13/00 |
| | | | | 700/275 |
| 2014/0346099 A1* | 11/2014 | Brantley | ............... | E03B 3/02 |
| | | | | 210/127 |
| 2014/0352842 A1* | 12/2014 | McEvilly | ............... | E04H 15/04 |
| | | | | 141/69 |
| 2016/0258137 A1* | 9/2016 | Delost | ............... | B65D 90/10 |
| 2017/0057602 A1* | 3/2017 | Cooper | ............... | B63B 1/047 |
| 2017/0328039 A1* | 11/2017 | Vakil | ............... | E03B 3/03 |
| 2018/0148139 A1* | 5/2018 | Cooper | ............... | B63B 35/00 |
| 2018/0148349 A1* | 5/2018 | Smith | ............... | C02F 1/325 |
| 2018/0170489 A1* | 6/2018 | Dziewolski | ............... | B63B 35/44 |
| 2018/0363276 A1* | 12/2018 | Larson | ............... | E03B 3/03 |
| 2020/0180736 A1* | 6/2020 | Cooper | ............... | B63B 35/00 |
| 2020/0354238 A1* | 11/2020 | Smith | ............... | C02F 1/32 |

\* cited by examiner

MOBILE RESERVOIR SYSTEM

PRIORITY

This application claims the benefit of and priority to U.S. patent application Ser. No. 15/794,975 filed on Oct. 26, 2017, now U.S. Pat. No. 10,703,765 issued on Aug. 4, 2020 and U.S. Provisional Application, entitled "Mobile Reservoir System," filed on Oct. 26, 2016 and having application Ser. No. 62/413,321.

FIELD

The field of the present disclosure generally relates to water filtration. More particularly, the field of the invention relates to an apparatus and a method for a mobile reservoir that is configured to filter and transport potable drinking water to a desired location.

BACKGROUND

Water scarcity is the result of myriad environmental, political, economic, and social forces. On one hand, freshwater makes up a very small fraction of all water on the planet. While nearly 70 percent of the world is covered by water, only 2.5 percent of may be considered freshwater, while the rest is comprised of saline, or is ocean-based. That being said, still just 1 percent of our freshwater is easily accessible, with much of it trapped in glaciers and snowfields. In essence, only an infinitesimal percent of the planet's water is available to fuel and feed its 6.8 billion people.

Due to geography, climate, engineering, regulation, and competition for resources, some regions seem relatively flush with freshwater, while others face drought and debilitating pollution. In much of the developing world, clean water is either hard to come by or a commodity that requires laborious work or significant currency to obtain. For example, India currently has major issues with respect to providing clean water to its people, despite having more than 2,000 miles of coastline and an annual monsoon season that rivals any rainfall on Earth. While the amount of freshwater on the planet has remained fairly constant over time— continually recycled through the atmosphere and back into our cups the population has exploded. This means that every year competition for a clean, copious supply of water for drinking, cooking, bathing, and sustaining life intensifies.

Conventional systems such as pipelines, desalination devices, and the like, have many drawbacks, such as being limited to a specific district, or to certain fixed point-to-point configurations. Moreover, due natural disaster and basic climate change, demand for clean, potable water can easily outpace fixed systems. Finally, conventional methods for creating potable water are not economically feasible for many of the regions that have the greatest need. For example, desalination facilities may cost over $1 billion, and take decades to achieve governmental and operational approval.

What is needed, therefore, is a system that is able to collect water, so that it may be filtered and sanitized for human consumption. What is also needed is a system that is capable of transporting the sanitized water to one or more desired locations. Indeed, unlike conventional water accumulation techniques, the mobile reservoir will be capable of moving to a desired region, climate, and the like, without the limitations of obtaining permits to build a new structure, etc.

SUMMARY

An apparatus and a method are provided for a mobile reservoir system to provide potable water. The mobile reservoir system is comprised of a waterborne vessel that includes a cargo hold. At least one collection unit comprised of a suitable material for safe and sterile storage of potable water is disposed in the cargo hold. One or more collectors are configured to channel rainwater into the collection unit. Each of the collectors is comprised of a sheet of a non-porous material supported on a retractable frame and a plurality of support arms. The sheet provides a surface area for collecting the rainwater. A porous material is configured to cover the collection unit and operate as a filter for collected rainwater. A retractable cover is configured to be extended over the cargo hold and provide protection to the collected rainwater in the collection unit. A filtration system is configured to offload the collected rainwater as potable water. The filtration system is comprised of a microfiltration unit that is configured to pass collected rainwater through one or more micro-filters and ultraviolet light. Cargo mainlines are configured and routed to pump collected rainwater from the collector unit to the microfiltration unit. Export lines are configured to route the potable water from the microfiltration unit to one or more ports disposed on the exterior of the waterborne vessel.

In an exemplary embodiment, a mobile reservoir system for providing potable water comprises: a waterborne vessel including a cargo hold; a collection unit disposed in the cargo hold; a collector configured to channel rainwater into the collection unit; a porous material configured to cover the collection unit; a retractable cover configured to be extended over the collection unit; and a filtration system configured to offload the rainwater as potable water.

In another exemplary embodiment, the collector is comprised of a sheet of a soft and non-porous material supported on a frame and a plurality of support aims, the sheet including a surface area for collecting the rainwater. In another exemplary embodiment, at least a portion of the frame is configured to be collapsed to facilitate retracting the collector to a position on top of the collection unit during nonuse. In another exemplary embodiment, the collector comprises a first collector disposed on a port side of the waterborne vessel and a second collector disposed on a starboard side of the waterborne vessel. In another exemplary embodiment, the collector is configured to be extended away from the collection unit for capturing rainwater, and wherein the collector is configured to be retracted to a position on top of the collection unit during nonuse.

In another exemplary embodiment, a buoy is configured to support the collector in a deployed state. In another exemplary embodiment, an active suspension coupling the collector and the buoy is configured to dampen movements of the collector due to weather and oceanic forces to stabilize the collector.

In another exemplary embodiment, the collection unit is comprised of a plurality of collection units that are configured to be disposed in the cargo hold. In another exemplary embodiment, each of the plurality of collection units is comprised of a suitable material for safe and sterile storage of potable water.

In another exemplary embodiment, the porous material is configured to be extended over a top of the cargo hold and operate as a filter for collected rainwater. In another exemplary embodiment, the porous material is configured to protect stored rainwater from environmental contaminants.

In another exemplary embodiment, a retractable cover is configured to be drawn over a deck of the waterborne vessel when rainwater is not being collected. In another exemplary embodiment, the retractable cover is comprised of a non-porous material that provides protection to the collected rainwater within the cargo hold.

In another exemplary embodiment, the filtration system is comprised of a microfiltration unit that is configured to pass collected rainwater through one or more micro-filters and ultraviolet light. In another exemplary embodiment, cargo mainlines are configured to route collected rainwater from the collection unit to the microfiltration unit, and wherein export lines are configured to route potable water from the microfiltration unit to one or more ports disposed on an exterior of the waterborne vessel.

In an exemplary embodiment, a method for a mobile reservoir system for providing potable water comprises: providing a waterborne vessel that includes a cargo hold; configuring one or more collection units for storing collected rainwater; modifying the cargo hold to receive the one or more collection units; configuring at least one collector to channel rainwater into the one or more collection units; covering the one or more collection units with a porous filter; extending a retractable cover over the collection units; and configuring a filtration system to offload the rainwater as potable water.

In another exemplary embodiment, configuring at least one collector comprises extending a sheet of a soft and non-porous material onto a frame and a plurality of support arms, the sheet providing a surface area for collecting the rainwater. In another exemplary embodiment, configuring the filtration system comprises routing cargo mainlines from the one or more collection units to a microfiltration unit whereby collected rainwater may be passed through one or more micro-filters and ultraviolet light. In another exemplary embodiment, configuring the filtration system further comprises routing export lines from the microfiltration unit to one or more ports disposed on an exterior of the waterborne vessel whereby potable water may be offloaded. In another exemplary embodiment, covering comprises configuring a porous material to be extended over a top of the cargo hold and operate as a filter for collected rainwater.

BRIEF DESCRIPTION OF THE DRAWINGS

The drawings refer to embodiments of the present disclosure in which.

Figure 1:
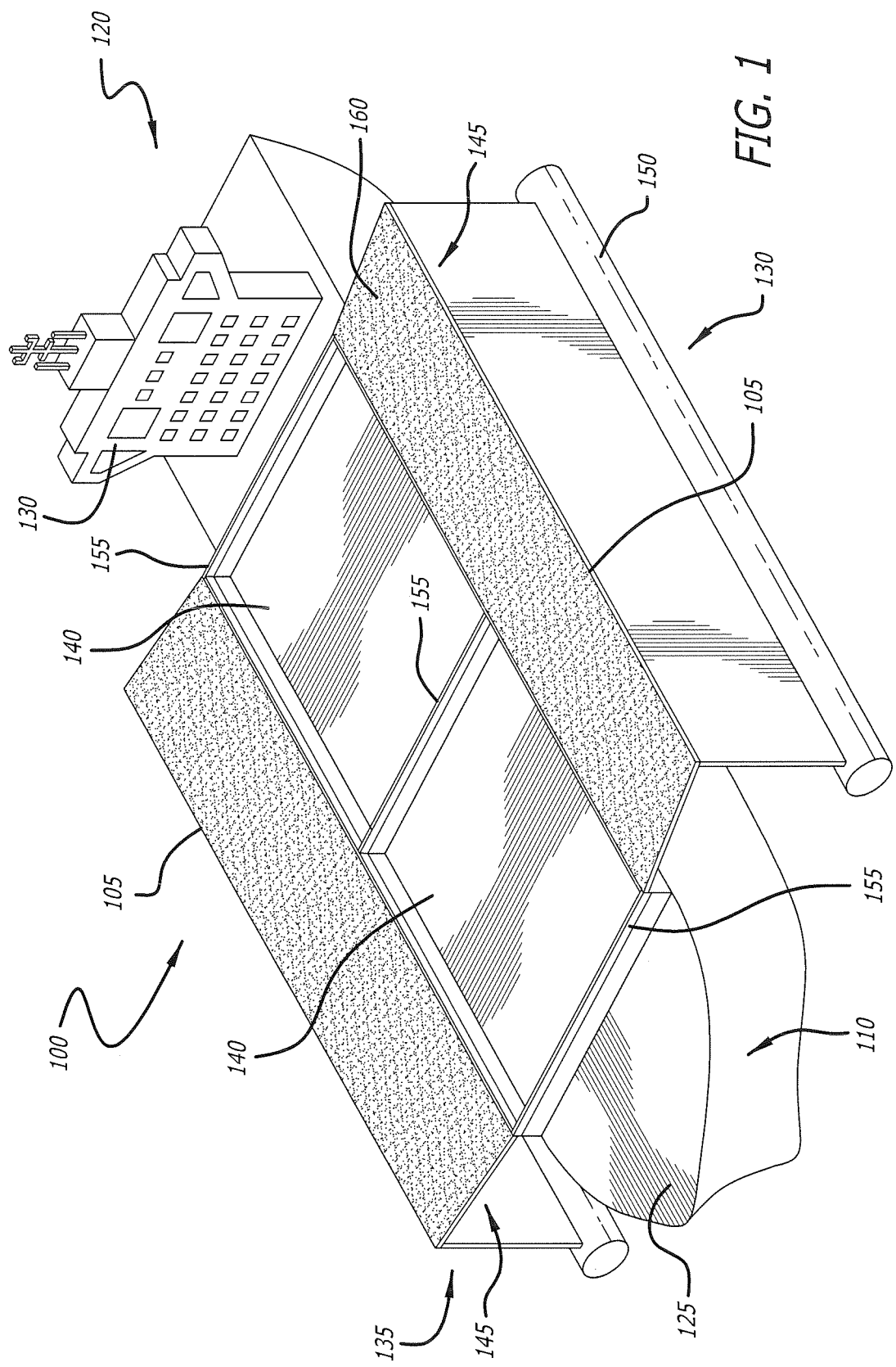
FIG. 1 illustrates a mobile reservoir system with collectors shown in an open configuration according to one embodiment of the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first reservoir," may be made. However, the specific numeric reference should not be interpreted as a literal sequential order but rather interpreted that the "first reservoir" is different than a "second reservoir." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for a mobile reservoir that is configured to collect, store, treat, and deliver rainwater as potable water. The collection of rainwater is of particular interest because it is naturally distilled, and because ocean air has fewer atmospheric contaminants as compared to air over populated areas. The mobile reservoir system utilizes a waterborne vessel comprising a plurality of storage compartments, a retractable cover, a plurality of collectors, and an onboard microfiltration system. A porous filter cover will be disposed and/or otherwise attached to the storage containers to protect the collected water from basic contamination such as ocean mist and animal waste. When the vessel is at capacity, a retractable non-porous cover will prevent evaporation, protect the water, and protect the vessel. In one embodiment, water storage compartments are coupled to a plumbing system that passes the collected water through a microfiltration system before being offloaded.

In one embodiment, a mobile reservoir system is configured to collect, store, treat, and deliver rainwater as potable water, comprising: a waterborne vessel comprising a plurality of water storage compartments that feature a retractable cover; a plurality of collectors configured to channel rainwater; and a porous filter cover coupled to the storage compartments so as to protect collected water from contamination such as ocean mist and animal waste, wherein the water storage compartments are coupled to a plumbing system that passes the collected rainwater through a microfiltration system before being offloaded.

In one embodiment, a method of collecting water is disclosed, comprising: modifying a waterborne vessel for the purposes of collecting rainwater, wherein the vessel comprises a plurality of storage compartments, a retractable cover, a plurality of collectors, and an onboard microfiltration system; collecting rainwater; providing a porous filter cover to the storage compartments to protect the collected rainwater from contamination; applying a retractable non-porous cover over the collected rainwater so as to prevent evaporation; and providing a plumbing medium so as to filter the collected rainwater through a microfiltration system prior to being offloaded.

Moreover, the mobile reservoir may be configured to transport the potable water to a desired destination. When configured as a vessel, the mobile reservoir system may navigate so as to take advantage of weather patterns, seasonal trends and the like, year round. Accordingly, the potential for production and deliverability is significantly improved as compared to conventional facilities. It is envisioned that the mobile reservoir system will be capable of docking at any sizeable seaport, thereby serving the growing global demand for potable water.

FIG. 1 illustrates a perspective view of a mobile reservoir system 100, comprising a vessel 110. The vessel 110 generally refers to any waterborne vehicle including, by way of non-limiting example, any of various ships, boats, hovercraft, rafts, and the like. Preferably, the vessel 110 comprises a stern 120; a propeller system (not shown); a deck 125; and a superstructure 130. In one embodiment, collectors 105 are disposed on a port side 130 and a starboard side 135 of the vessel 105. It is envisioned that the collectors 105 are capable of extending and retracting depending on the weather/season and whether the mobile reservoir system 100 is in a water collecting stage or a delivery stage.

The purpose of the collectors 105 is to provide a surface area upon which rainwater may be collected. Consequently, it is preferable to have collectors 105 that extend substantially the same length as the vessel 110. As the purpose of the collectors 105 is to cause harvesting of the rainwater, the collectors 105 are preferably comprised of a soft, non-porous material that limits absorption of the water that is collected thereon. In general, porous materials as used herein are materials with pores (cavities, channels or interstices). It is to be understood that characteristics of a porous material vary depending on the size, arrangement and shape of the pores, as well as the porosity (the ratio of the total pore volume relative to the apparent volume of the material) and composition of the material itself. In one embodiment, the collectors 105 may be disposed at an angle greater than 0-degrees with respect to one or more collection units 140 so as to channel water into the collection units. As will be appreciated, the exact angle of the collectors 105 may be varied depending on at least a desired rate at which rainwater is to be channeled into the collection units 140.

Figure 2:
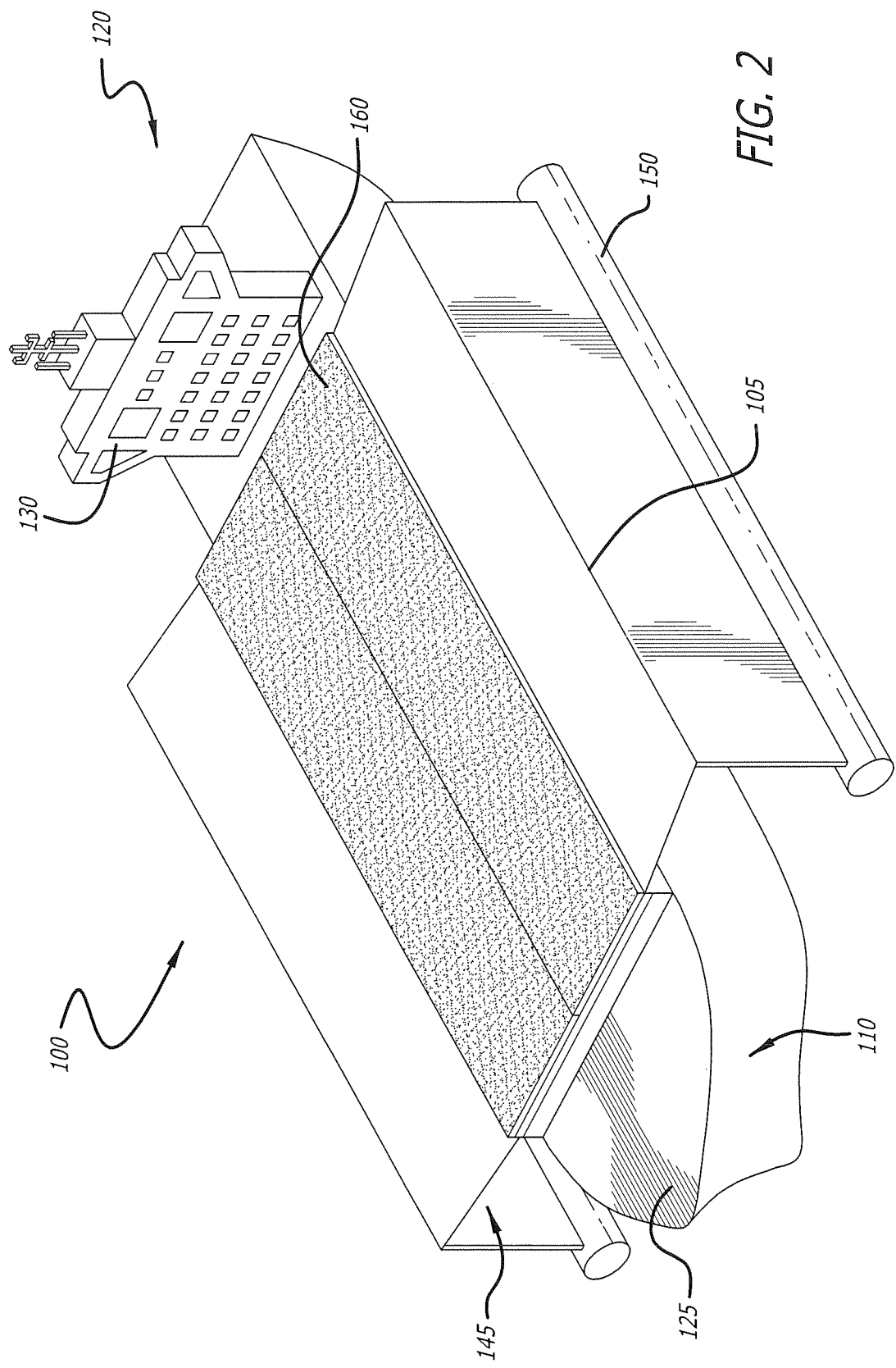
FIG. 2 illustrates a front view of the mobile reservoir system of FIG. 1, with the collectors shown in a closed configuration, according to the present disclosure.

As best shown in FIG. 2, when the collectors 105 are not in use, they may be moved into a retracted state, thereby providing an extra layer of protection over the collection units 140, while also improving the aerodynamic characteristics of the vessel 110. Accordingly, it should be understood that that the collectors 105 may be capable of being extended, or deployed, and retracted as necessary during various periods of the rainwater collection process. As shown in FIG. 1, each collector 105 comprises a frame 145, a plurality of support arms 155, a buoy 150, an active suspension (discussed below in connection with FIG. 3), and a system for deployment and retraction.

In one embodiment, the frame 145 is comprised of a primarily metallic substructure, although any other material may be utilized without limitation. In one embodiment, the frame 145 comprises an exoskeletal structure so as to reduce weight while retaining strength and stability characteristics. In some embodiments, the frame 145 includes various attachment points so as to facilitate extending a sheet comprised of a soft, non-porous material 160 for collecting rainwater. Various portions of the frame 145 may be collapsible and foldable, so that larger collectors 105 may be utilized. The buoys 150 are shown as having a generally cylindrical shape, although any other shape may be utilized without exceeding the scope and spirit of the present disclosure.

Referring again to FIG. 2, when the mobile reservoir system 100 is not in a water-collecting state, the collectors 105 may be moved into the retracted state. However, if the weather changes or if rainwater collection appears to be feasible, then the collectors 105 may be extended into the deployed state shown in FIG. 1. In so doing, beginning in the retracted state, the underlying frame 145 may be first extended. Thereafter, the non-porous material 160 may be deployed by way of a roller mechanism, for example, to fill the frame 145 of each collector 105. The roller mechanism may be automatic or manual, and may be implemented using any suitable electronic systems, as well. In one embodiment, the non-porous material 160 is permanently attached to the frame 145, so that the roller mechanism may be omitted. In such implementations, retracting the non-porous material 160 may provide an additional layer of protection for water stored in the collector units 140. The non-porous material 160 may be almost any material, but it is preferable to use a material that allows the rainwater to easily glide thereon, with minimal absorption properties. As will be noted, when the frame 145 is fully deployed, it is positioned advantageously higher than the deck 125 of the vessel 110, thereby creating a clean runoff directly into the collector units 140.

Figure 3:
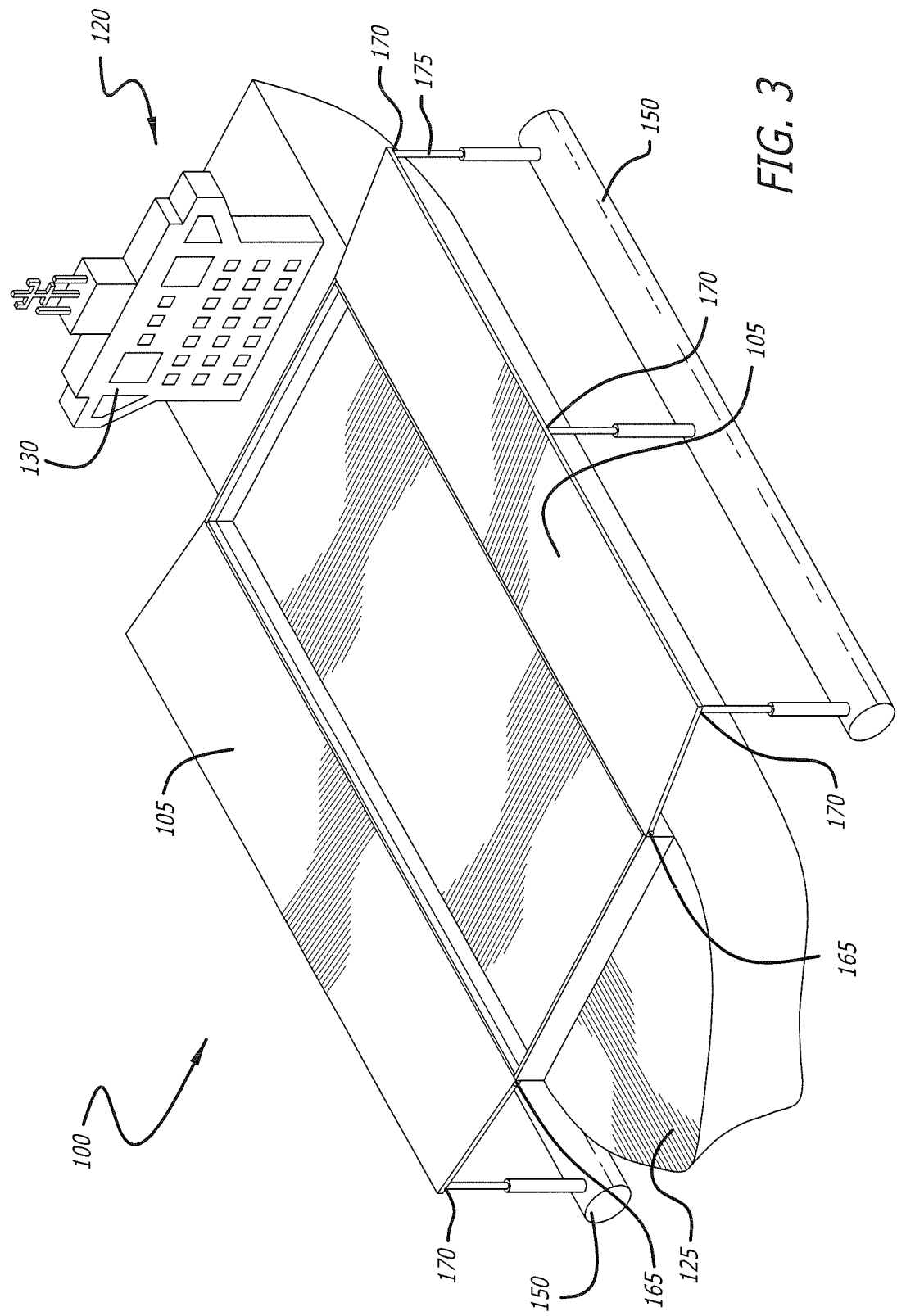
FIG. 3 illustrates a perspective view of the suspension arrangement of the mobile reservoir system of FIG. 1, according to the present disclosure.

As shown in FIG. 3, the mobile reservoir system 100 comprises a robust, active suspension so as to manage wind, rain, and oceanic forces that will be placed on the vessel 110. The base of the frame 145 comprises a barrel hinge system 165 so as to allow each respective collector 105 to absorb the energy of the wind and/or rain on what is essentially a horizontal and perpendicular sail. It is envisioned that the barrel hinge system 165 will also prevent the movement of the collectors 105 from affecting the vessel 110. In tandem with the barrel hinge system 165, a suspension system is configured to couple various points of the exterior perimeter of the frame 145 and the support arms 155, discussed in connection with FIG. 1. In one embodiment, a hydraulically actuated hinge joint 170 is communicatively coupled to the frame 145 and the buoy 150, so as to introduce positive and negative camber as necessary. In one embodiment, the vertical connector 175 from the hinge joint 170 to the buoy 150 comprises a telescopic suspension system that is configured so as to absorb vertical forces from ocean waves, for example. It should be understood that when fully extended, the collectors 105 effectively replicate horizontal planes that mimic the behavior of conventional sails. Consequently, the mobile reservoir system 100 may be configured to counteract any forces arising due to the moving ocean under the buoys 150, as well as any compression and lift forces due to the wind acting on the surface area of the collectors 105.

Figure 4:
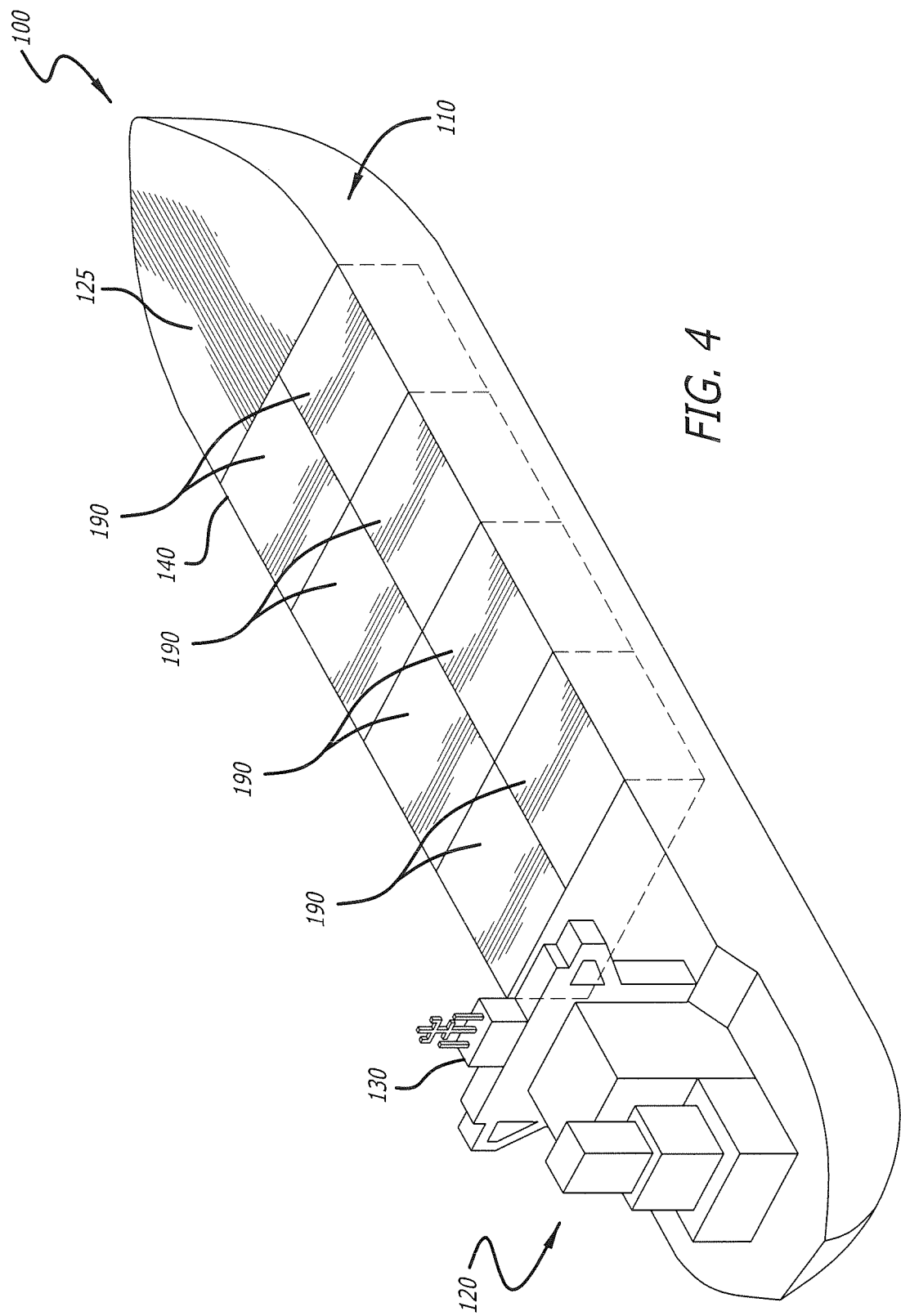
FIG. 4 illustrates a perspective view of a plurality of cargo holds of the mobile reservoir system of FIG. 1, according to the present disclosure.

FIG. 4 illustrates a perspective view of a plurality of cargo holds 190 comprising the mobile reservoir system 100 of FIG. 1, according to the present disclosure. In one embodiment, each cargo hold 190 comprises one or more collection units 140 that are comprised of a suitable material for safe and sterile storage of water, such as stainless steel. The internal structure of the cargo holds 190 may be modified to provide load bearing capabilities with respect to the vessel 110. Preferably, the collection units 140 are removable from the vessel 110 to facilitate cleaning, repairing and/or replacement of the collection units. It should be understood that the collection units 140 may be molded and/or otherwise configured to couple with the cargo holds 190 of a particular vessel. Accordingly, it should be recognized that the specific configuration of the collection units 140 depends on the particular vessel 110 into which the collection units 140 are to be deployed. Further, the collection units 140 may be implemented with any of various ports and fittings suitable for connecting pumps and/or other subsystems, such as filtration systems, so as to facilitate treating collected water, as desired.

Figure 5:
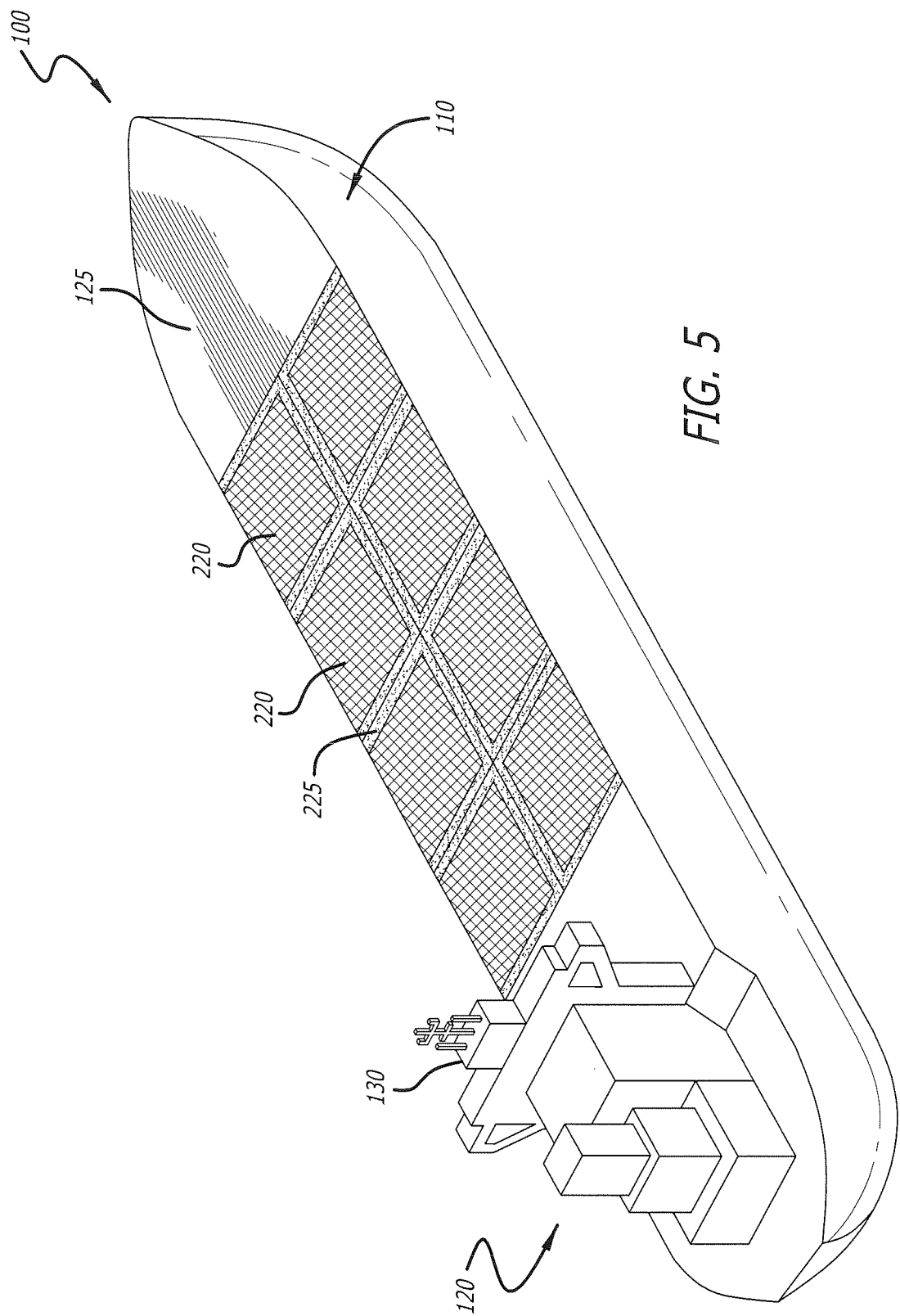
FIG. 5 illustrates a perspective view of a plurality of porous filters and non-porous trim of the mobile reservoir system of FIG. 1, according to the present disclosure.

FIG. 5 illustrates a perspective view of a plurality of porous filters and non-porous trim that may be coupled with the mobile reservoir system of FIG. 1, according to the present disclosure. It should be understood that rainwater harvested directly into sterile containers is the most naturally filtered water that is available on Earth. Consequently, the degree of filtration required before the rainwater may be deemed potable is minimal. As such, a porous material 220 may be extended over the open tops of the cargo holds 190 to operate as a first filter. The porous material 220 may be supported over the cargo holds 109 by way of the non-porous trim 225, as shown in FIG. 5. It is contemplated that the porous material 220 will protect the collected rainwater from contamination due to the elements, such as ocean mist, animal contamination, and any potential atmospheric pollution. It is further contemplated, that the rainwater will be tested and monitored for contamination during collection and transport. In some embodiments, however, additional filtration may be utilized during unloading the collected rainwater from the collection units 140.

Figure 6:
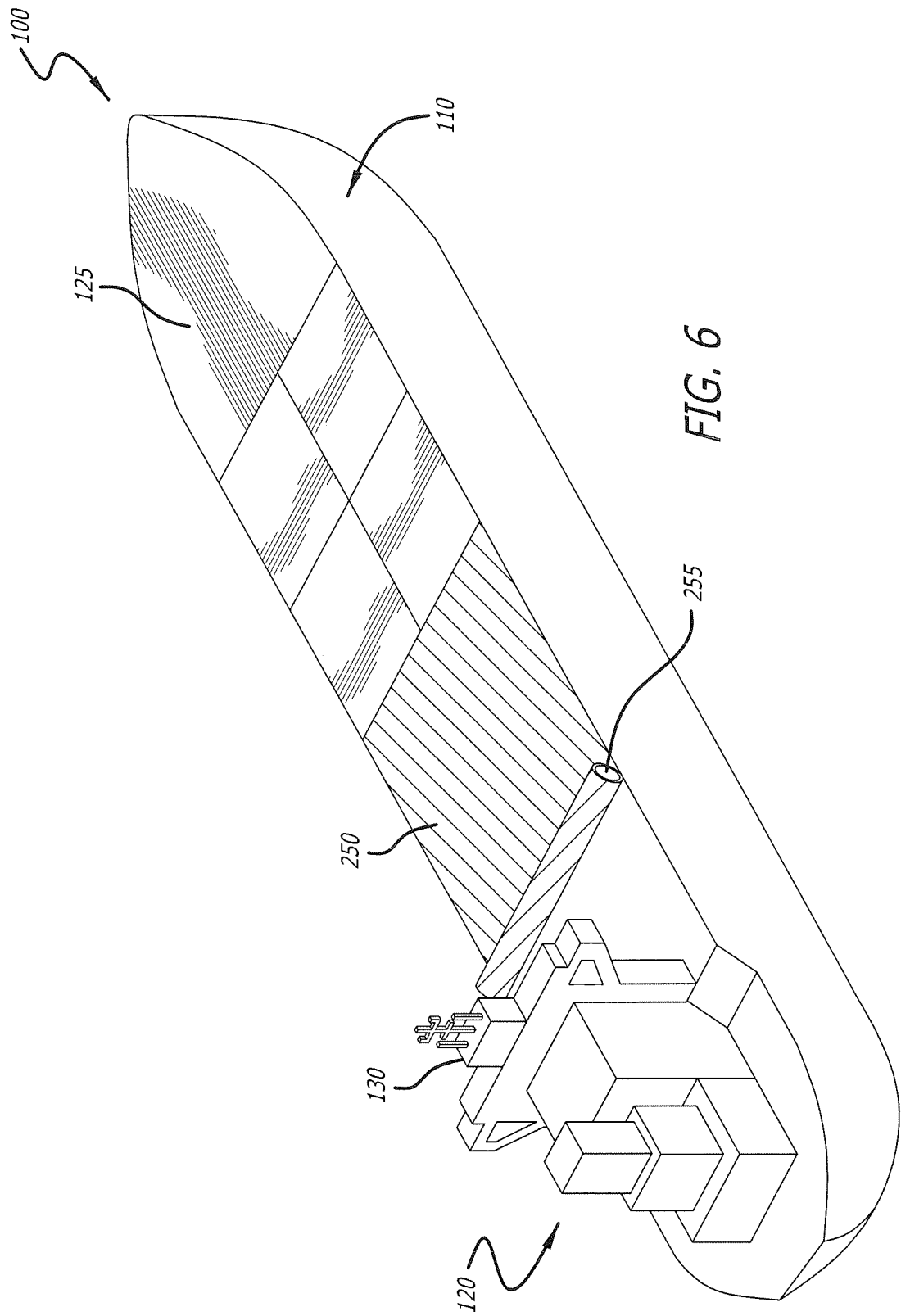
FIG. 6 illustrates a perspective view of a non-porous cover of the mobile reservoir system of FIG. 1, according to the present disclosure.

FIG. 6 illustrates a perspective view of a retractable cover 250 that may be drawn over the deck 125 of the vessel 110 when rainwater is not being collected. The retractable cover 250 may be comprised of a non-porous cover that provides protection to the collected rainwater when, for example, the collection units 140 are full, or when weather conditions are unsuitable for collecting rainwater. In one embodiment, the retractable cover 250 may be deployed by way of one or more roller mechanisms 255, whereby the retractable cover may be unrolled from a cylindrical arrangement and extended over the tops of the cargo holds 190. Further, the roller mechanisms 255 may be configured to roll the retractable cover 250 into the cylindrical arrangement so as to remove the retractable cover 250 from the cargo holds 190 when rainwater collection is desired. It is contemplated that in addition to providing protection to the collected rainwater, the retractable cover 250 may further operate to prevent heating and evaporation of the collected rainwater.

Figure 7:
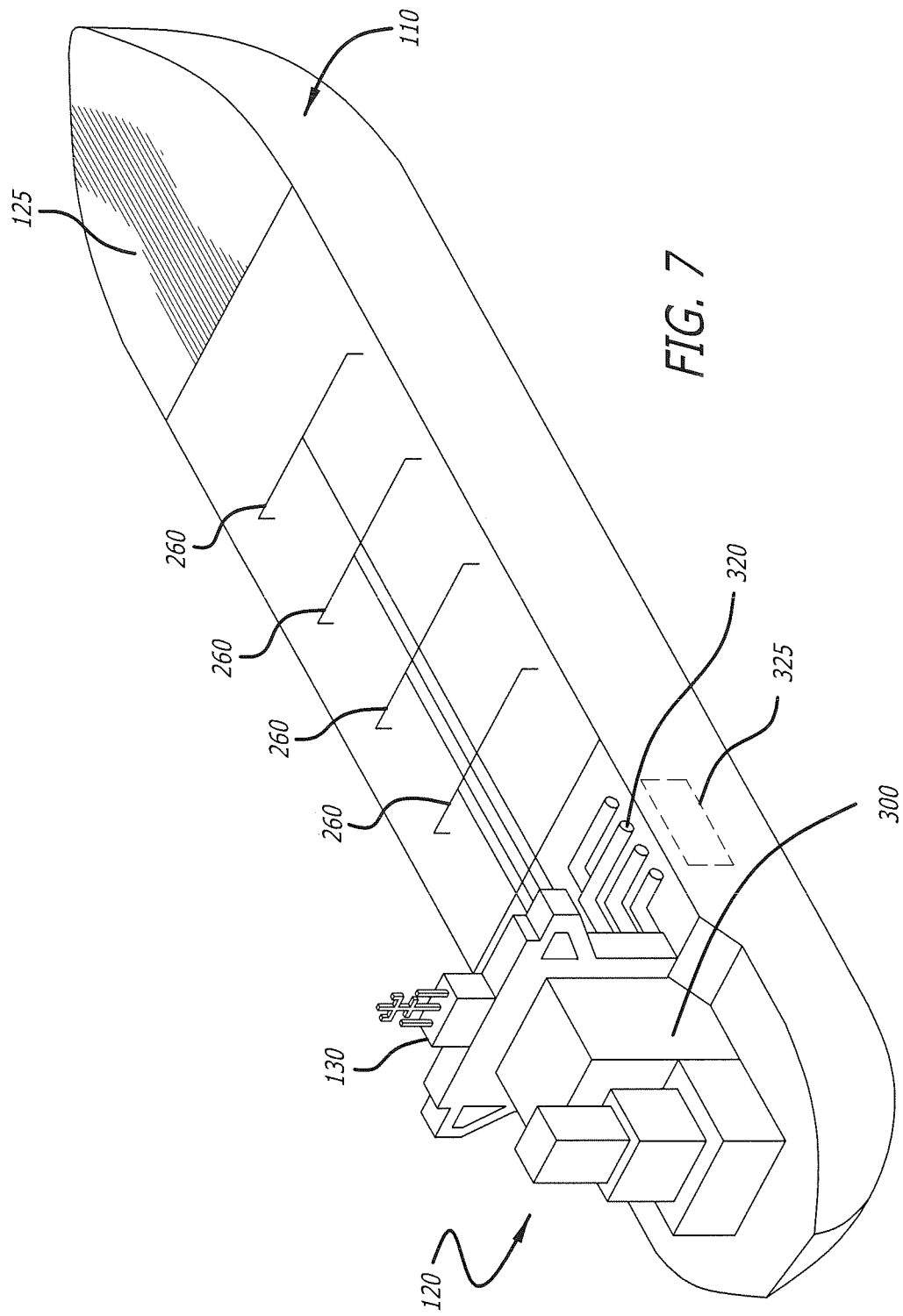
FIG. 7 illustrates a perspective view of cargo and export mainlines of the mobile reservoir system of FIG. 1, according to the present disclosure.

Referring now to FIG. 7, a perspective view of cargo and export mainlines of the mobile reservoir system of FIG. 1 is shown, according to the present disclosure. In one embodiment, cargo mainlines 260 are configured and routed to pump collected rainwater from the collection units 140 to a microfiltration unit 300 built into the superstructure 130 of the vessel 110. Preferably, the microfiltration unit 300 is configured to pass the water through one or more microfilters, as well as expose the water to ultraviolet light, before the water is offloaded. It is contemplated that the need for ultraviolet treatment will be dependent on the results of testing and monitoring of the collected rainwater, as well as depending on any ultraviolet exposure that may occur within the collection units 140. After filtration and treatment of the rainwater is complete, sanitized, potable water may be routed through a plurality of export lines 320 to one or more ports 325 disposed on the exterior of the vessel 110.

Figure 8:
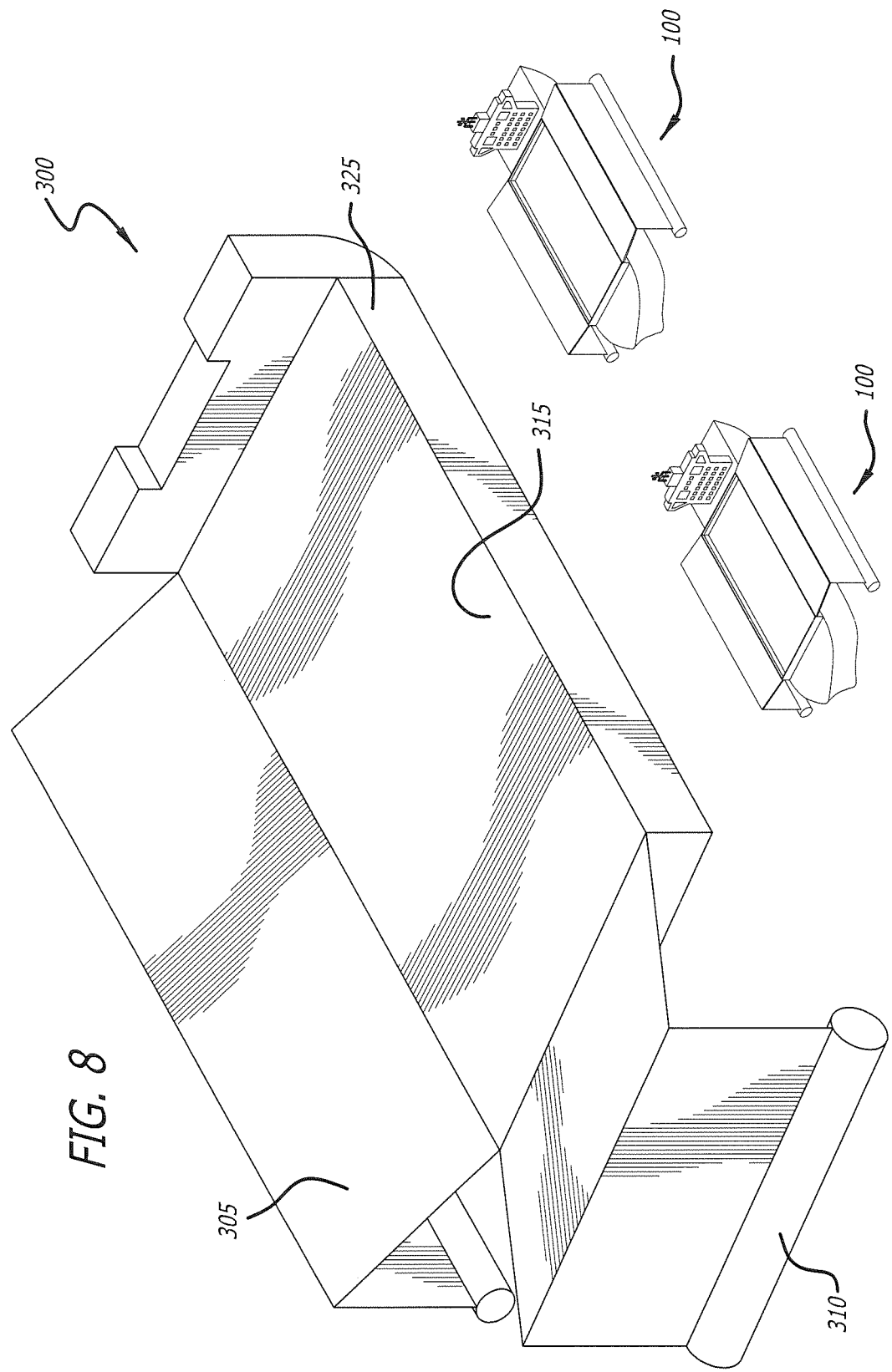
FIG. 8 illustrates a perspective view of a plurality of mobile reservoir systems in conjunction with a mother ship system, according to the present disclosure.

FIG. 8 illustrates a perspective view of a plurality of mobile reservoir systems in conjunction with a mother ship system, according to the present disclosure. As shown, a collection vessel 300 may be utilized in a static, anchored configuration so as to provide significantly greater water collection capability as compared to the mobile reservoir systems 100. The collection vessel 300 may offload collected rainwater to a plurality of mobile reservoir systems 100, whereby the collected rainwater may be delivered to desired destinations. The exact scale of the collection vessel 300 may be varied and modified without exceeding the spirit and scope of the present disclosure. By way of non-limiting example, the scale of the collection vessel 300 may range between 2 times and 20 times the size of the mobile reservoir system 100.

In one embodiment, the collection vessel 300 comprises a plurality of collectors 305 and 310, and a collection unit 315. It is to be understood that the collectors 305 and 310 are functionally the same as the collectors 105, and the collection unit 315 is functionally the same as the collection unit 140. The size and scale of the collectors 305, 310, however may be varied depending on the size of the collection vessel 300, and the size of the collection unit 315 may be varied according to a desired collection capacity. Further, in some embodiments, the collection vessel 300 may be capable of navigating bodies of water. As such, a superstructure may be included, along with all necessary motors, engines and propulsion mechanisms. Further still, in some embodiments, the mobile reservoir systems 100 and the collection vessel 300 may be operated remotely, or even operated in an autonomous fashion, without limitation, and without deviating beyond the spirit and scope of the present disclosure.

Methods for a mobile reservoir system 100 may include, in some embodiments, providing a waterborne vessel 110 that includes a cargo hold 190. One or more collection units 140 for storing collected rainwater may be configured to be disposed in the cargo hold 190. Each of the one or more collection units 140 may be comprised of a suitable material for safe and sterile storage of potable water. In some embodiments, the cargo hold 190 may be modified to receive the one or more collection units 140.

In some embodiments, the methods may further include configuring at least one collector 105 to channel rainwater into the one or more collection units 140. In some embodiments, configuring at least one collector 105 may comprise extending a sheet of a soft and non-porous material onto a frame 145 and a plurality of support arms 155. Accordingly, the sheet provides a surface area for collecting the rainwater.

The methods may further include, in some embodiments, covering the one or more collection units 140 with a porous material 220. In some embodiments, the porous material 220 may be extended over a top of the cargo hold 190 and configured to operate as a filter for collected rainwater. The porous material 220 may be configured to protect stored rainwater from environmental contaminants. Further, in some embodiments, the methods may include extending a retractable cover 250 over the collection units 140. The retractable cover 250 may be configured to be drawn over a deck 125 of the waterborne vessel 110 when rainwater is not being collected. In some embodiments, the retractable cover 250 may be comprised of a non-porous material that provides protection to the collected rainwater in the cargo hold 190.

The methods may further include, in some embodiments, configuring a filtration system to offload the rainwater as the potable water. The filtration system may be comprised of cargo mainlines 260 that are routed from the one or more collection units 140 to a microfiltration unit 300 whereby collected rainwater may be passed through one or more micro-filters and ultraviolet light. In some embodiments, configuring the filtration system may further include routing export lines 320 from the microfiltration unit 300 to one or more ports 325 disposed on the exterior of the waterborne vessel 110 whereby potable water may be offloaded.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A method for providing potable water, the method comprising the steps of:
   providing a waterborne vessel that includes a cargo hold capable of holding one more water collection units for storing collected rainwater;
   providing at least one collector to channel rainwater into said one or more water collection units;
   covering the one or more water collection units with a porous filter;
   extending a retractable cover over the collection units;
   providing a filtration system to filter any collected rainwater to produce filtered rainwater; and
   pumping said filtered rainwater off said vessel.

2. The method of claim 1, wherein said step of covering said at least one collector comprises extending a sheet of a non-porous material onto a frame and a plurality of support arms, the sheet providing a surface area for collecting the rainwater.

3. The method of claim 1, wherein said filtration system includes cargo mainlines connected to the one or more collection units and to a microfiltration unit whereby collected rainwater may be passed through one or more micro-filters and ultraviolet light.

4. The method of claim 3, wherein said filtration system further comprises export lines extending from the microfiltration unit to one or more ports disposed on an exterior of the waterborne vessel whereby potable water may be offloaded.

5. The method of claim 1, wherein said step of covering comprises extending a porous material over a top of the cargo hold which serves to filter rainwater being collected.

* * * * *